Jan. 5, 1943.    J. KINNEY    2,307,318
SEDIMENT TESTER
Filed Oct. 5, 1940
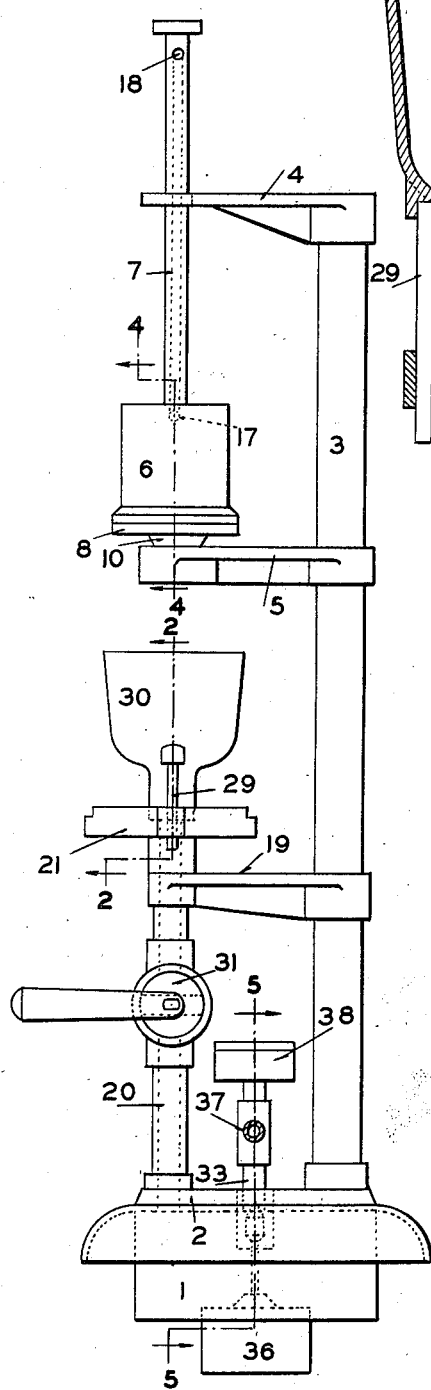
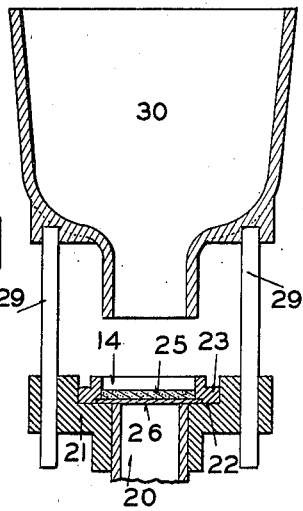
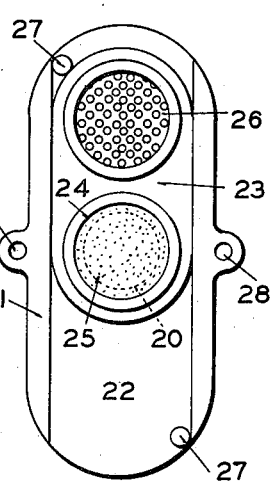
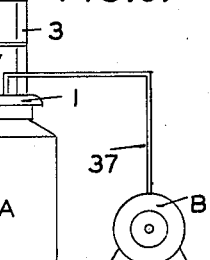
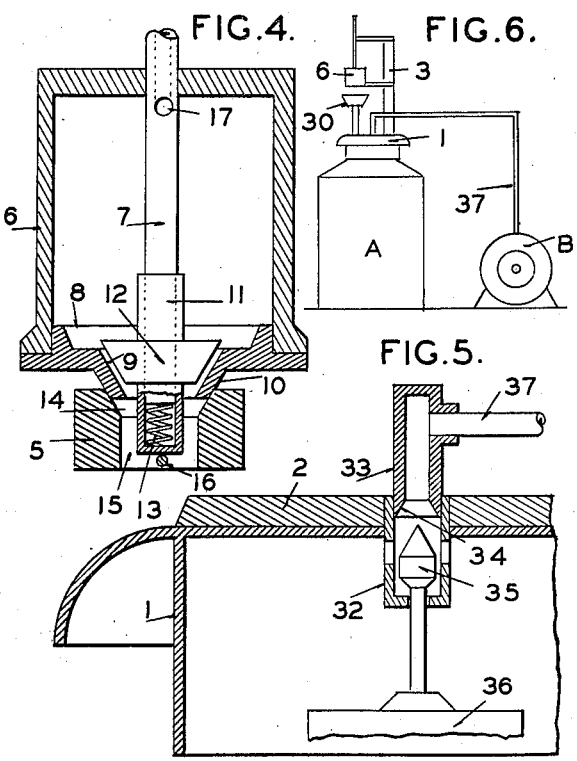
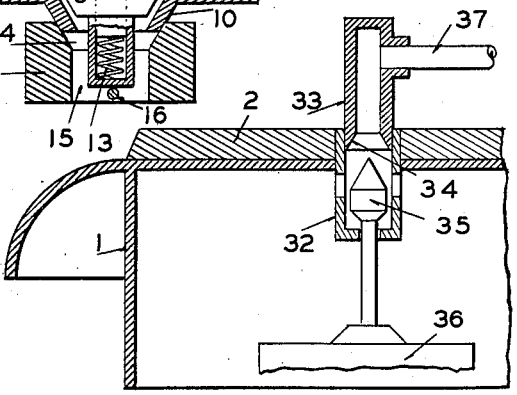
INVENTOR
JAMES KINNEY
BY
ATTORNEY Patented Jan. 5, 1943

2,307,318

UNITED STATES PATENT OFFICE 2,307,318

SEDIMENT TESTER

James Kinney, Wayland, Mich., assignor to Pet Milk Company, St. Louis, Mo., a corporation of Delaware Application October 5, 1940, Serial No. 359,857

4 Claims. (Cl. 73—51)

My invention relates to an apparatus for testing the amount of sediment contained in a liquid such as milk. It is customary at milk receiving stations to test the milk by passing a sample of given bulk, usually one pint, through a filter pad and determining the purity of the milk by the amount of sediment deposited upon the pad. Various forms of apparatus have heretofore been devised for making such tests usually depending upon the action of a hand pump to force the milk through the filter. Such devices are slow in action and wasteful of time when a large number of samples have to be taken. This is particularly true in cold weather when difficulty is often encountered in passing the milk through the pad.

One object of my invention is to provide a sediment testing apparatus by means of which the tests may be made in the minimum of time and by a substantially continuous operation. This I accomplish by employing vacuum furnished by power driven means to draw the milk through the filter; by providing convenient means for diluting the milk when found desirable; and by providing means for changing the filter pads without delaying the operation of the device.

In the accompanying drawing which illustrates a sediment tester made in accordance with my invention, Figure 1 is a side elevation; Figure 2 is an enlarged section taken on line 2—2 of Figure 1, the funnel being shown in raised position; Figure 3 is a top plan view of the parts shown in Figure 2, the funnel being removed; Figure 4 is an enlarged section taken on the line 4—4 of Figure 1; Figure 5 is an enlarged section taken on line 5—5 of Figure 1 but showing a slight modification; and Figure 6 is a diagrammatic view.

Referring first to Figure 1, the numeral 1 indicates a lid or cover adapted to have an airtight fit on the container which receives the samples which have been tested. This container is preferably a standard ten gallon milk can indicated at A (Figure 6). Secured to the cover is the base plate 2 of the device. This base carries an upright 3 provided with arms 4 and 5 forming a rack for supporting the milk sampler. This sampler, shown in detail in Figure 4, comprises an inverted cup 6 rigidly mounted on a stem or handle 7 and a removable bottom cap 8. The cap is provided with a valve seat 9 formed in a downwardly projecting centering boss 10, preferably conical in form. Slidingly mounted on the lower end of the stem is a sleeve 11 having its lower end closed and carrying a valve 12 cooperating with the seat 9. Positioned between the closed end of the sleeve and the lower end of the stem is a coil spring 13 for biasing the valve toward closed position. The boss 10 enters a correspondingly shaped seat 14 in an opening 15 through the arm 5. In the opening 15 is a stop 16 to engage the lower end of sleeve 11 and automatically unseat valve 12 when the sampler is placed in position in the rack. To permit the escape of air from the cup, the upper end of the stem is made hollow and provided with an inlet opening 17 and an outlet opening 18.

Mounted in the base 2 is a tube 20 the lower end of which extends through the base and the cover 1 to discharge milk into the receptacle A. This tube is positioned directly below the opening 15 in arm 5 and is braced by a bracket 19. Mounted on the upper end of the tube is a table 21. This table is provided with a longitudinal way 22 in which slides a duplex filter pad holder 23 having a pair of openings 24 to receive the filter pads 25. The bottoms of these openings 24 are each closed by a foraminous diaphragm 26 of perforated sheet metal, wire gauze, or the like. In the way 22 are a pair of stops 27 for the holder 23. These stops are so placed that when the holder is against one of them the opening 24 at its opposite end will be directly over the tube 20. Formed at the sides of the table are a pair of openings 28 to receive guide pins 29 on a funnel 30. This permits the funnel to be lowered so that its small end will enter one of the openings 24 or to be raised, as shown in Figure 2, to permit the movement of the holder from one end of the way to the other. Interposed in the tube 20 is a plug valve 31 to open or close the passage through the tube.

Located in the center of base 2 is a short tube 32 having an upwardly extending portion 33 in the lower end of which is a valve seat 34. Within the tube is a valve 35 carried on a float 36 and cooperating with the seat 34 to close communication between the tube 32 and a pipe 37 leading to a power driven suction pump B (Figure 6). A pressure gauge 38 may be mounted on the extension 33, as shown in Figure 1, to indicate the pressure within the container or this gauge may be omitted as shown in Figure 5.

In the operation of my device the sampler is removed from its rack and lowered into the can of milk to be tested. When the sleeve 11 makes contact with the bottom of the can, the valve 12 will be unseated permitting the cup to be filled with milk from near the bottom of the can which contains the maximum amount of sediment. The sampler is now placed in position in the rack, the valve 31 being first turned to closed position. Contact of sleeve 11 with stop 16 opens the valve 12 discharging the contents of the cup into the funnel 30. If the milk is too thick to filter properly, it may now be diluted with hot water. For this purpose the capacity of the funnel should be greater than that of the cup. The valve 31 is now turned to open position. The milk is now sucked down through the filter pad by the partial vacuum in the container. I have found a vacuum of twenty inches to be satisfactory for this purpose. When all the milk from the funnel has been drawn through the filter pad, valve 31 is closed, the funnel 30 raised and the pad holder 23 shifted from one end of the table to the other ready for the next test. By means of the duplex holder a used pad may be removed and replaced by a new one while the filtering operation is taking place through the other pad. When the container A becomes full, the float 36 will be raised closing the valve 35. This cuts off communication between the container and suction pump B, thus avoiding injury to the latter by milk being drawn over into it.

Having fully described my invention, what I claim as new and desire to secure by Letters Patent of the United States is:

1. In a sediment tester, a container, means for reducing the air pressure in said container, means for supporting a filter pad, said means communicating with the container, a milk sample receptacle adapted to be positioned in contact with a pad on said supporting means, a milk sampler for discharging a predetermined quantity of milk into the receptacle, said receptacle being of greater capacity than the sampler, and a valve for closing the communication between the container and the receptacle whereby a milk sample of given bulk in the receptacle may be diluted before passage through the pad to provide a standard test.

2. In a sediment tester, a container, a cover for said container, a tube mounted on said cover and communicating with the container, a filter pad table on said tube, said table having a way in its upper face, a duplex pad holder sliding in said way to position a selected pad in communication with the container, and a funnel mounted on said table by guide rods whereby it is movable into and out of contact with a pad on the holder.

3. In a sediment tester, a container, means for reducing the air pressure in said container, a pad receiving table communicating with the container, a duplex pad holder sliding on said table to position a pad in communication with the container, and a milk sample receptacle adapted to be positioned in contact with a pad on said holder.

4. In a sediment tester, a container, a cover for said container, a tube mounted on said cover and communicating with the container, a filter pad table on said tube, a duplex pad holder sliding on the table to position a selected pad in communication with the container, and a vertically movable funnel adapted to be positioned in contact with a pad on said holder.

JAMES KINNEY.